(12) United States Patent
Bandoh et al.

(10) Patent No.: US 6,282,672 B1
(45) Date of Patent: Aug. 28, 2001

(54) SYSTEM FOR SIMULTANEOUSLY EXECUTING ANY ONE OF PLURALITY OF APPLICATIONS THAT MUST BE EXECUTED USING STATIC DATA NOT MODIFIED BY ANOTHER COMPUTER PROGRAM

(75) Inventors: Toshiyuki Bandoh, Yokohama; Yoshiaki Shinmura, Chigasaki; Katsuhisa Miyata, Yokohama; Masakazu Torii, Naka-gun; Satoshi Ishikawa, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/241,058

(22) Filed: Feb. 1, 1999

(30) Foreign Application Priority Data

Jan. 30, 1998 (JP) .................................................. 10-019306

(51) Int. Cl.⁷ .................................................... G06F 12/00
(52) U.S. Cl. ............................................... 714/6; 707/204
(58) Field of Search ................................... 707/202–204; 714/6, 20

(56) References Cited

U.S. PATENT DOCUMENTS

| | | | |
|---|---|---|---|
| 5,379,398 | * | 1/1995 | Cohn et al. ........................... 711/154 |
| 5,497,483 | * | 3/1996 | Beardsley et al. ........................ 714/1 |
| 5,497,484 | * | 3/1996 | Potter et al. ........................... 707/200 |
| 5,724,500 | * | 3/1998 | Shinmura et al. ........................ 714/6 |
| 5,845,291 | * | 12/1998 | Winokur ............................... 707/200 |
| 5,933,593 | * | 8/1999 | Arun et al. .............................. 714/6 |
| 5,933,836 | * | 8/1999 | Gobat .................................. 707/207 |
| 6,061,770 | * | 5/2000 | Franklin ............................... 711/162 |

FOREIGN PATENT DOCUMENTS

11327986 * 3/1999 (JP) ................................ G06F/12/00

* cited by examiner

Primary Examiner—Christopher B. Shin
(74) Attorney, Agent, or Firm—Antonelli, Terry, Stout & Kraus, LLP (57) ABSTRACT

A method, apparatus and computer program which allows the simultaneous execution of an application that requires input/output of static data not modified by another application after a particularly point in time and another application. The invention provides static data controller which determines whether an application has issued a data input/output request. The static data controller sends the data input/output request issued by the application requiring input/output of static data not modified by another application after a particular point in time to a first external storage device and a data input/output request issued by any other application to a second external storage device.

54 Claims, 8 Drawing Sheets

Identification information for accessing the external storage device 5 containing static data

| Identification information = 1 | Identification information = 3 | Identification information = 4 |
|---|---|---|
| Identification information = 6 | ......... | |

Identification information for accessing the external storage device 6 containing the latest data updated by other applications

| Identification information = 2 | Identification information = 5 | Identification information = 7 |
|---|---|---|
| Identification information = 8 | ......... | |

Information indicating relations between identification information and external storage device

| Identification information | Device to be accessed |
|---|---|
| Identification information = 1 | External storage device 5 containing static data |
| Identification information = 2 | External storage device 6 containing the latest data updated by other applications |
| Identification information = 3 | External storage device 5 containing static data |
| Identification information = 4 | External storage device 5 containing static data |
| Identification information = 5 | External storage device 6 containing the latest data updated by other applications |
| Identification information = 6 | External storage device 5 containing static data |
| Identification information = 7 | External storage device 6 containing the latest data updated by other applications |
| Identification information = 8 | External storage device 6 containing the latest data updated by other applications |

TB91

SYSTEM FOR SIMULTANEOUSLY EXECUTING ANY ONE OF PLURALITY OF APPLICATIONS THAT MUST BE EXECUTED USING STATIC DATA NOT MODIFIED BY ANOTHER COMPUTER PROGRAM

TECHNICAL FIELD

The present invention relates to a method, apparatus and computer program for taking a backup copy of the contents of an external storage device to be accessed by a data processing system. More particularly, the present invention relates to a method, apparatus and computer program for simultaneously executing any one of a plurality of applications (computer programs) that must be executed using static data not modified by another computer program after a particular point in time and another application which must be executed using updated data.

BACKGROUND OF THE INVENTION

Accompanying the recent increase in the use of data processing systems, and the extension of business hours or the shift to 24-hour uninterrupted operation, it has become difficult to allocate time, after stopping execution of an application for updating data, for execution of an application for processing data in a static state in which no data updating operation is being performed. It should be noted that an application can, for example, be a computer program or any other such means for performing a particular processing on data. The application for processing data could, for example, be a computer program for taking a backup copy, executing statistical processing on daily business results, etc. Hence, apparatus have been sought for simultaneously executing an application for performing a data updating operation and an application that must be executed in the state in which no data updating operation has been performed.

To solve the above Japanese Patent Laid-open No. Hei 5-94265 proposes a mechanism in which, in a multiple-writing filing system, the multiple-writing configuration is cleared and an application is allowed to update one of the cleared devices. The controller takes a backup copy of the other device in a static state in which no updating operation is being performed.

Japanese Patent Laid-open No. Hei 6-44010 proposes that all or part of a data set to be affected by an updating operation is written to a subsystem memory. The update is then written to the subsystem memory to complete the updating operation. In response to an input request from the backup copy, the data in the not-updated portion is input from the original data set, and the data in the updated portion is input from the subsystem memory.

The method disclosed in Japanese Patent Laid-open No. Hei 5-94265 does not consider a situation in which an application other than an application taking a backup copy references static data that has not been updated. Therefore, this conventional arrangement must execute an application that requires static data after storing a backup copy taken by the backup copy taking application into an external storage device to maintain the logical integrity of the data.

The method disclosed in Japanese Patent Laid-open No. Hei 6-44010 does not consider application of the disclosed technology to any type of application. Therefore, this conventional arrangement needs to be aware of whether an area for data input/output operations by each application requiring application of the disclosed technology has been updated or not. This presents problems of making applications complicated and pushes up the cost of the entire system.

SUMMARY OF THE INVENTION

The present invention provides improvements in a method, apparatus and a computer program for applying, to any given application, a capability of inputting/outputting static data not modified by any application after a particular point in time without affecting an application requiring a data updating operation in an external storage device associated with an access operation by a data processing system.

According to one aspect of the invention, a duplicate of data stored in an external storage device requiring input/output of static data not modified by an application after a particular point in time is taken. A static data input/output controller for controlling a data input/output request to the external storage device and the duplicate thereof and a static data input/output identification data defining module for identifying whether a data input/output request is for static data are arranged in a processing unit. The static data input/output controller determines whether the source of the data input/output request requests static data based on the information in the static data input/output identification information defining module. If the input/output request is for the static data not modified by an application after a particular point in time, the static data input/output controller performs a data input/output operation on one external storage device with the static data. For other input/output requests, the controller performs a data input/output operation on the other external storage device.

Some applications complete logical input/output processing of data upon completion of two or more data input/output requests. To allow these applications to reference the static data having logical integrity these applications are cooperatively associated. Access by these applications to the external storage device is temporarily discontinued in a state in which the logical integrity of the data is maintained, and then the static data input/output controller is started.

Other applications complete logical input/output processing of data upon completion of the data input/output requests of two or more external storage devices. To allow these applications to reference the static data having logical integrity, the start processing of the static data input/output controller for these two or more external storage devices is performed all at once, thereby allowing reference to the static data in these two or more external storage devices at a same point in time having the data logical integrity.

BRIEF DESCRIPTION OF THE DRAWINGS

The scope of the present invention will be apparent from the following detailed description, when taken in conjunction with the accompanying drawings, and such detailed description and specific examples, while indicating preferred embodiments of the invention, are given by way of illustration only, since various changes and modifications within the spirit and scope of the invention will become apparent to those skilled in the art from this detailed description, in which.

DETAILED DESCRIPTION OF THE INVENTION

Figure 1:
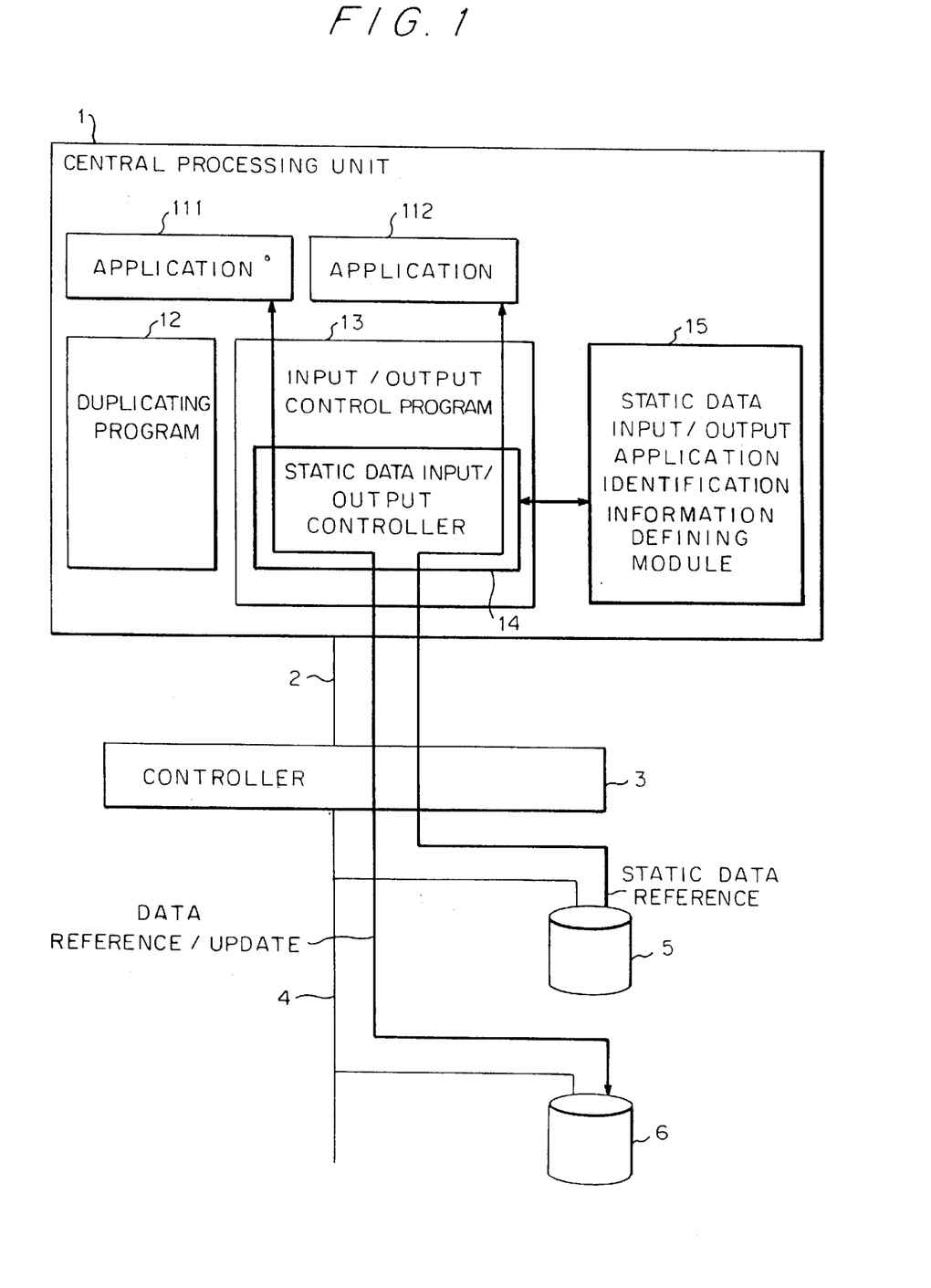
FIG. 1 is a schematic diagram illustrating a first preferred embodiment of the present invention.

FIG. 1 is a schematic diagram illustrating a first preferred embodiment of the present invention. As shown in FIG. 1, reference numeral 1 denotes a processing unit for executing various computer programs. Reference numerals 111 and 112 denote applications that operate in the central processing unit 1. Application 111 denotes an application that does not require any input/output of static data not modified by an application after a particular point in time. Application 112 denotes an application that requires input/output of static data not modified by an application after a particular point in time. Reference numeral 12 denotes a duplicating computer program for implementing a duplicate of external storage devices (external storage devices 5 and 6 in the embodiments herein) that operate in the central processing unit 1. Reference numeral 14 denotes a static data input/output controller that operates in the central processing unit 1 to determine an application which is the source of a data input/output request and support input/output of data not modified by another application after a particular point in time. Reference numeral 15 denotes a static data input/output application identification information defining module for defining identification information for identifying an application that requires input/output of data not modified by another application after a particular point in time. Reference numeral 2 denotes a bus for connecting the central processing unit 1 to a controller 3, which controls a data input/output operation with the external storage devices 5 and 6. Reference numeral 4 denotes a bus for connecting the controller 3 to the external storage devices 5 and 6, which are connected to the controller 3.

Figure 2:
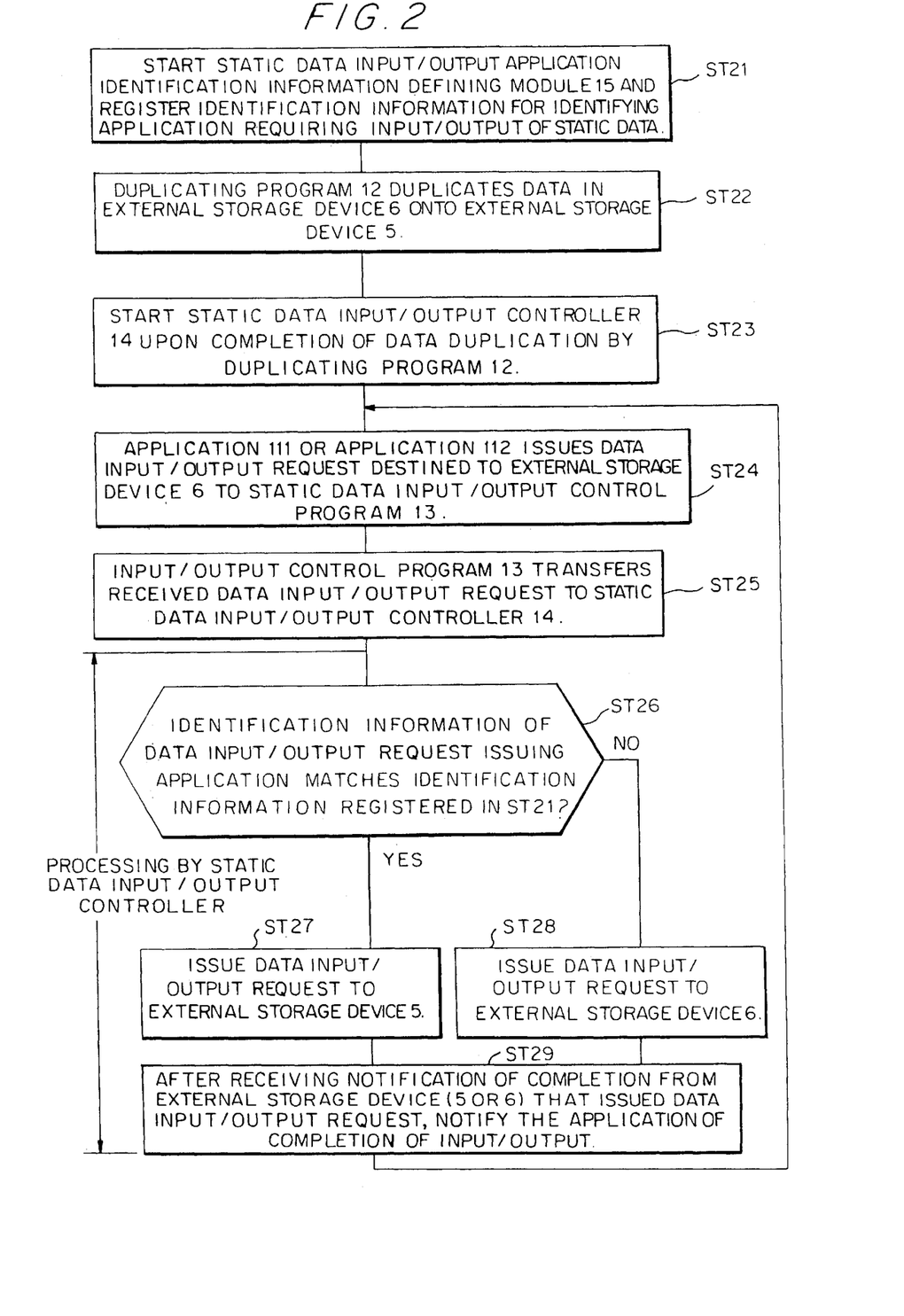
FIG. 2 is a flowchart illustrating the processing performed by the present invention in the system shown in FIG. 1.

The following describes the operation of the above-mentioned embodiment. In the following description, the external storage device 6 is assumed to be the data duplicating source while the external storage device 5 is assumed to be the data duplicating destination. FIG. 2 is a flowchart illustrating the processing of applying a capability of inputting/outputting static data not modified by another application after a particular point of time to any application. It should be noted that each of the steps of the flowchart can, for example, correspond to one or more instructions of a computer program that when executed by a computer causes the computer to perform the indicated steps. The computer program can, for example, be stored in memory in the computer, stored on a storage medium, such as a floppy disk, CD ROM, etc, and installed in the computer, or provided to the computer via a network, such as a local area network, internet, etc.

Referring to FIG. 2, in step ST21, the identification information for identifying an application requiring input/output of static data not modified by another application after a particular point in time is registered in the static data input/output application identification information defining module 15. The information suitable for use as the identification information includes an application registration name for identifying an application, a job class for specifying application executing environment, a load module attribute indicative of the attribute of an application program, and a library name indicative of a library in which the application program is stored. If the external storage devices 5 and 6 are shared by two or more processing units, a system identifier for identifying the central processing unit is used as the application identification information. In such a case, an application requiring input/output of static data not modified by another application after a particular point in time and an application not requiring reference to the static data may be executed in separate processing units. Alternatively, apparatus may be provided that notifies, from an application, the static data input/output application identification information defining module whether the application or the data input/output request requires input/output of the static data not modified by another application after a particular point in time. The identification information can, for example, be stored in a table which, for example, can be included in the static data input/output application identification information defining module.

In step ST22, to make preparations for operating the capability of referencing the static data in the external storage device 6, the duplicating program 12 is started to duplicate the data in the external storage device 6 onto the external storage device 5. When the data in the external storage device 6 has been duplicated, the static data input/output controller 14 is started in step ST23.

When the static data input/output controller 14 has been started, the application 111 or the application 112 issues a data input/output request to the input/output control program 13 in step ST24. This data input/output request is issued as a data input/output request to the external storage device 6, which is the data duplicate source, regardless of the application that issued the data input/output request.

In step ST25, if the input/output control program 13 finds that the data input/output request is directed to the external storage device 6, the input/output control program 13 transfers this data input/output request to the static data input/output controller 14.

Figure 7:
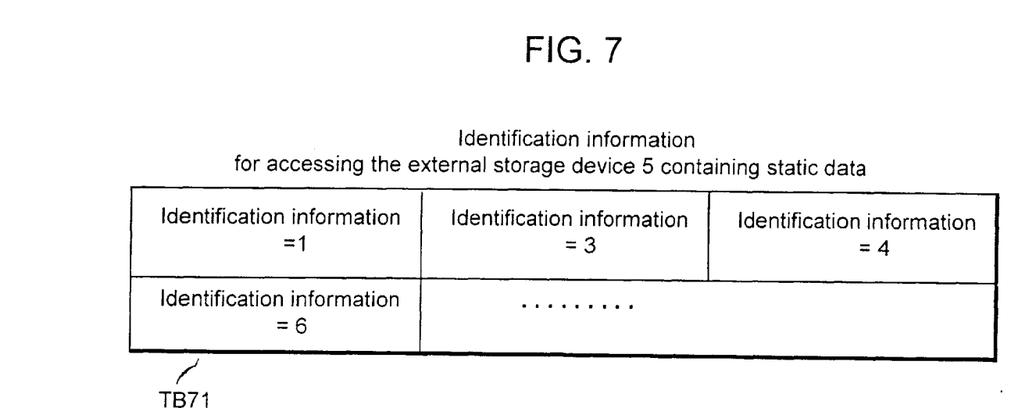
FIG. 7 illustrates a table which stores identification information defined in the static data input/output application identification information defining module 15.

FIG. 7 is an example of a table TB71 that stores the identification information defined in the static data input/output application definition information defining module 15. Table TB71 lists the identification information possessed by an application that input/outputs static data. If the identification information of the application is registered in the table TB71, the application executes an input/output to the external storage device 5 containing static data. If the identification information of the application is not registered in the table TB71, the application executes an input/output to the external storage device 6 containing the data updated by other applications.

Figure 8:
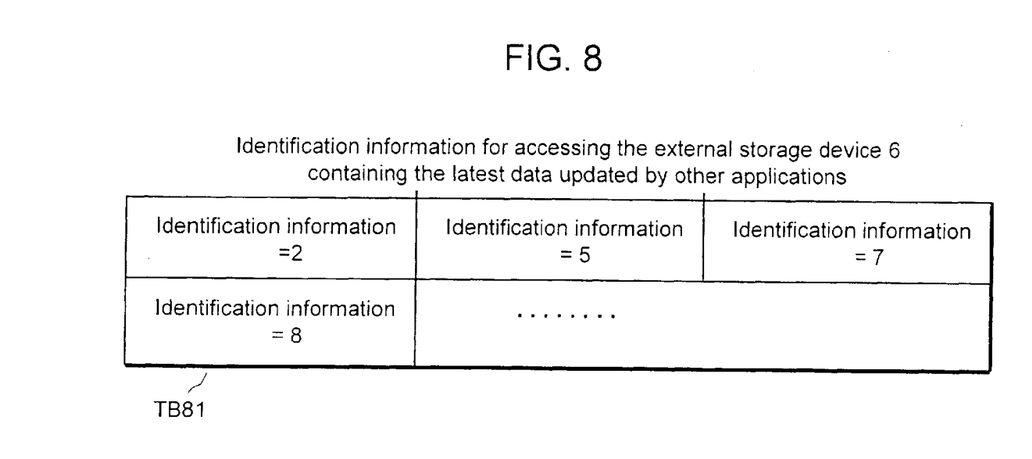
FIG. 8 illustrates a table which stores identification information of the application that executes input/output to the external storage device 6.
Figure 9:
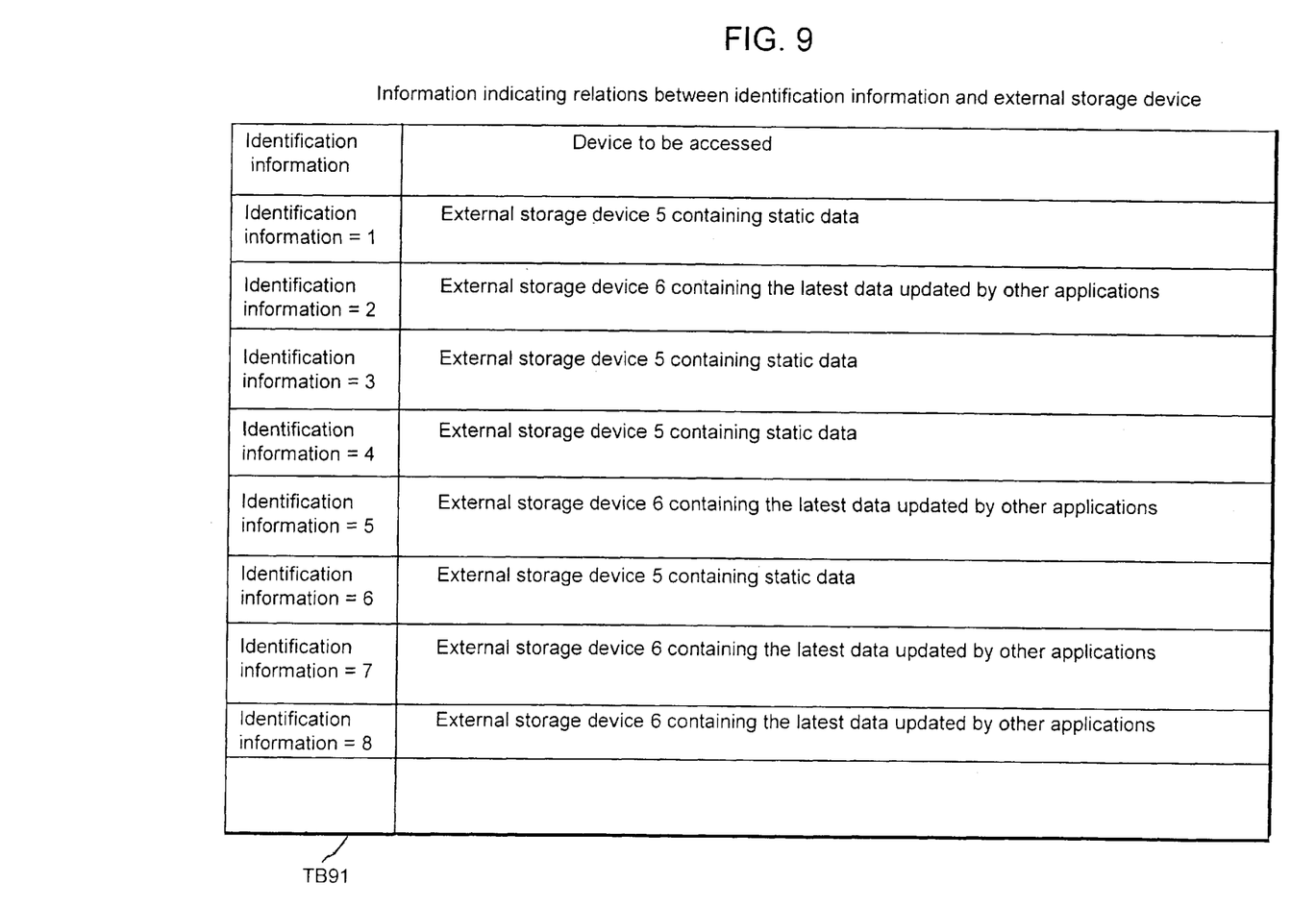
FIG. 9. illustrates a table which stores information that relates the identification information with the input/output target.

The table TB71, which stores the identification information defined in the static data input/output application definition information defining module 15, can, for example, be either of the tables illustrated in FIGS. 8 and 9. Table TB81, lists the identification information of the application that executes an input/output to the external storage device 6 containing the data updated by other application. Table TB91, illustrated in FIG. 9, provides information indicating relations between all identification information and the external storage device which is the input/output target.

In step ST26, the static data input/output controller 14 determines whether the identification information held by the application that issued the data input/output request matches the identification information already registered in the static data input/output application identification information defining module 15.

If the identifier of the above-mentioned identification information held by the application is found matching the identifier of the above-mentioned identification information already registered in step ST26, then the operation of step ST27 is executed. In step ST27, the static data input/output controller 14 converts the data input/output request for the external storage device 6 into a data input/output request for the external storage device 5 and issues the resultant data input/output request to the external storage device 5. If the above-mentioned identifiers do not match each other in step ST26, the operation of step ST28 is executed. In step ST28, the static data input/output controller 14 sends the data input/output request issued by the application directly to the external storage device 6.

In step ST29, receiving a notification of completion from the external storage device (5 or 6) to which the data input/output request was issued, the static data input/output controller 13 reports the notification of input/output completion to the application (111 or 112) that issued the data input/output request.

The processing operations performed in step ST26 through step ST29 allow the application 111 and the application 112 to perform a data input/output operation without being aware of the external storage device 5 in which the static data is stored. The application 112 can input/output the static data that has not been modified by an application subsequent to the point of time at which the operation of step ST23 was executed.

Using, as the duplicating program 12, the method disclosed in Japanese Patent Laid-open No. Hei 6-44010 as discussed above, the data in the external storage device 6 may also be duplicated without pausing the application in execution. The duplicating program 12 may also be a program operating in the controller 3 or a program that executes duplication by operating associating a program operating in the processing unit 1 and the program operating in the controller 3.

The external storage device, based on which the −17 duplicating program 12 performs a duplicating operation, may be either a physical unit such as a magnetic disk or a logical unit such as a file or a data set.

The external storage devices 5 and 6 may be either a physical medium such as a magnetic disk, a virtual device such as a file or a table developed in the main memory of the central processing unit 1, or a logical device such as a time-zero backup to be generated when the duplicating method disclosed in Japanese Published Examined Patent No. 2557172. In addition, the external storage devices 5 and 6 may be different types of external storage devices.

EMBODIMENT 2

Figure 3:
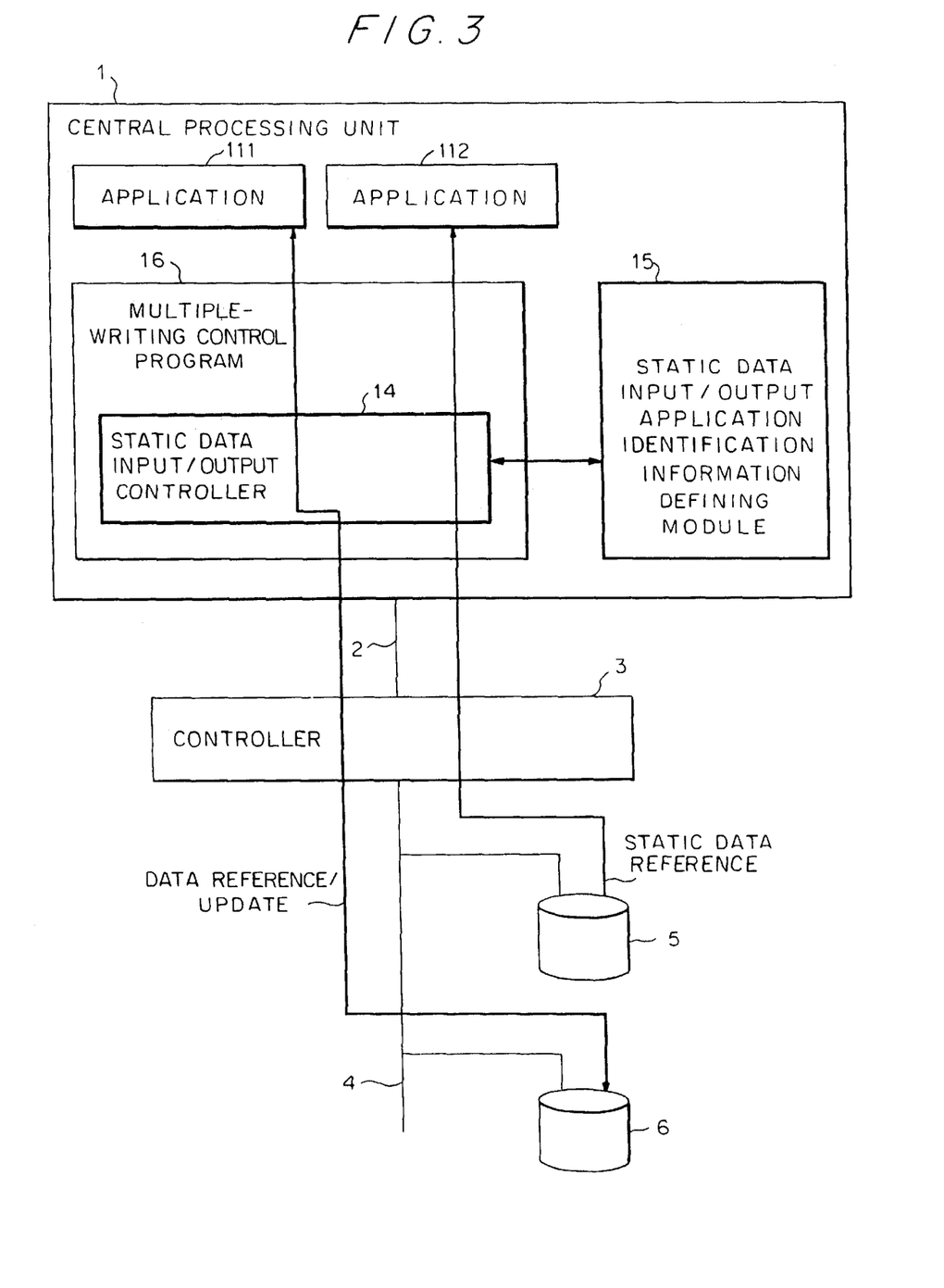
FIG. 3 is a schematic diagram illustrating a second embodiment of the present invention.

FIG. 3 illustrates a second embodiment of the present invention to be applied if a duplicate of the data stored in the external storage device 6 already exists because the external storage devices 5 and 6 operate as multiple-writing devices due to a multiple-writing control program operating in the central processing unit 1. Referring to FIG. 3, reference numeral 16 denotes a computer program operating in the central processing unit 1 to execute multiple-writing control on the external storage devices 5 and 6. In the following description, the external storage device 5 is assumed to be a sub device of a multiple-writing control device while the external storage device 6 is assumed to be a main device of the multiple-writing control device for the sake of description.

Figure 4:
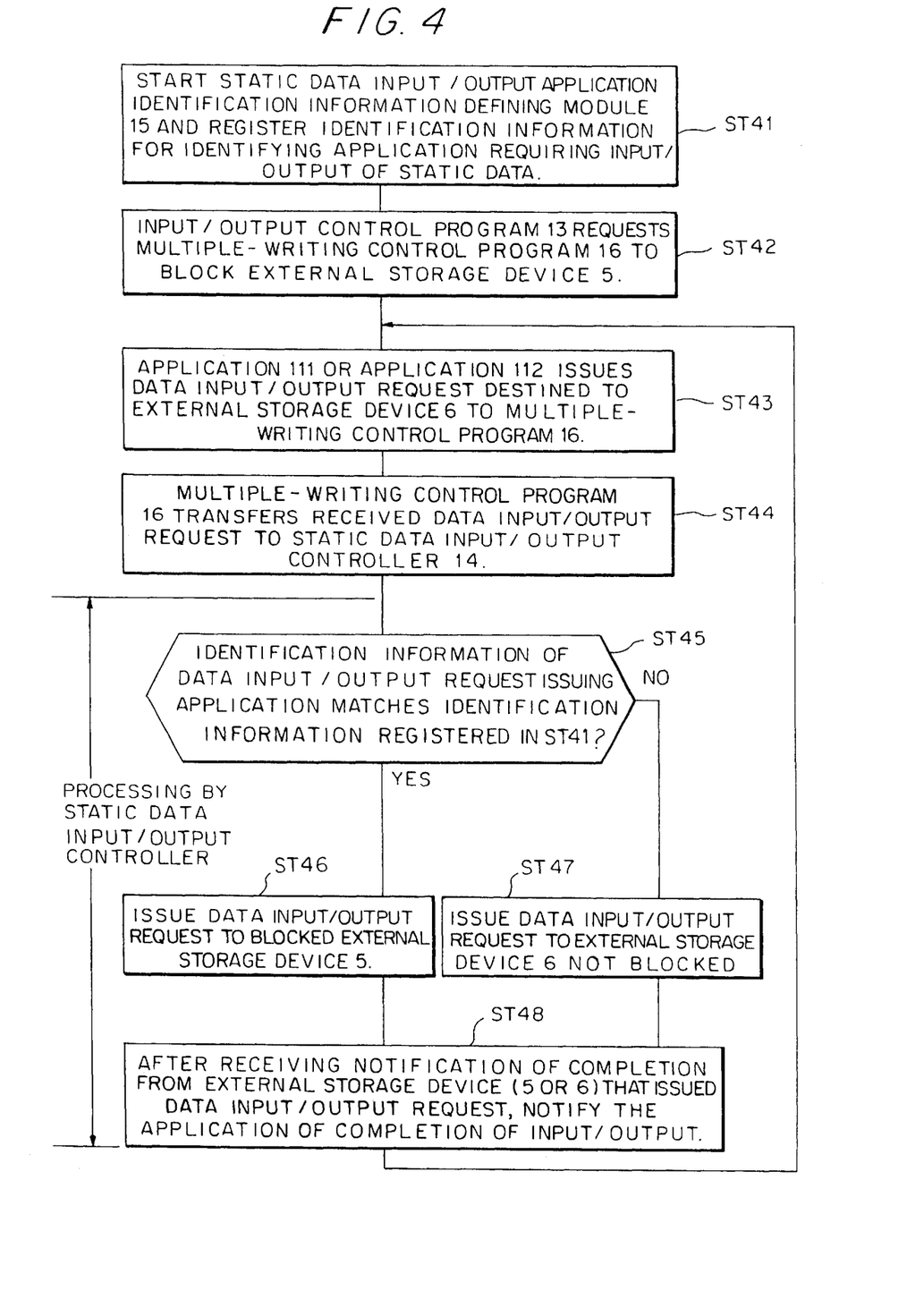
FIG. 4 is a flowchart illustrating the processing performed by the present invention in the system shown in FIG. 3.

FIG. 4 is a flowchart illustrating the processing of applying, in the system illustrated in FIG. 3, a capability of inputting/outputting static data not modified by an application after a particular point of time to any other application. It should be noted that each of the steps of the flowchart can, for example, correspond to one or more instructions of a computer program that when executed by a computer causes the computer to perform the indicated steps. The computer program can, for example, be stored in memory in the computer, stored on a storage medium, such as a floppy disk, CD ROM, etc, and installed in the computer, or provided to the computer via a network, such as a local area network, internet, etc.

Referring to FIG. 4, the identification information for identifying an application that requires input/output of the static data not modified by another application after a particular point in time is registered in the static data input/output application identification information defining module 15 in step ST41. In step ST42, the static data input/output controller 14 requests the multiple-writing control program 16 to block the external storage device 5, or the sub device. When the external storage device 5 has been blocked, a data input/output request is issued from the application 111 or the application 112 to the multiple-writing control program 16 in step ST43. This data input/output request is issued as a data input/output request for the external storage device 6, which is the main device like the conventional multiple-writing controller, regardless of whether the input/output of the static data is required or not.

In step ST44, if the multiple-writing control −19 program 16 finds that the above-mentioned data input/output request is for the external storage device 6, then the multiple-writing control program 16 transfers this data input/output request to the static data input/output controller 14. In step ST45, the static data input/output controller 14 determines whether the identification information held by the application that issued the above-mentioned data input/output request matches the identification information registered in the static data input/output application identification information defining module 15 in step ST41.

If the identifier of the data input/output request source is found matching the registered identifier in step ST45, the operation of step ST46 is executed. In step ST46, the static data input/output controller 14 issues a data input/output request to the blocked external storage device 5. On the other than, if no match is found between the identifier of the data input/output request source and the registered identifier in step S45, the operation of step ST47 is executed. In step ST47, the static data input/output controller 14 sends the data input/output request issued by the application to the external storage device 6.

In step ST48, receiving a notification of completion from the external storage device (5 or 6) to which the data input/output request has been issued, the static data input/output controller 14 reports the input/output completion to the application (111 or 112) that issued the data input/output request.

The processing operations performed in step ST45 through step ST48 allow the application 111 and the application 112 to perform an input/output operation without being aware of the blocked external storage device 5 in which the static data is stored. The application 112 can input/output the static data that has not been modified by an application subsequent to the point in time at which the operation of step ST42 was executed. The device to be blocked in step ST42 may be the external storage device 6, which is the main device of the multiple-writing controller. In this case, the external storage device 5 and the external storage device 6 to which the data input/output request is issued in step ST46 and step ST47 may be exchanged.

EMBODIMENT 3

Figure 5:
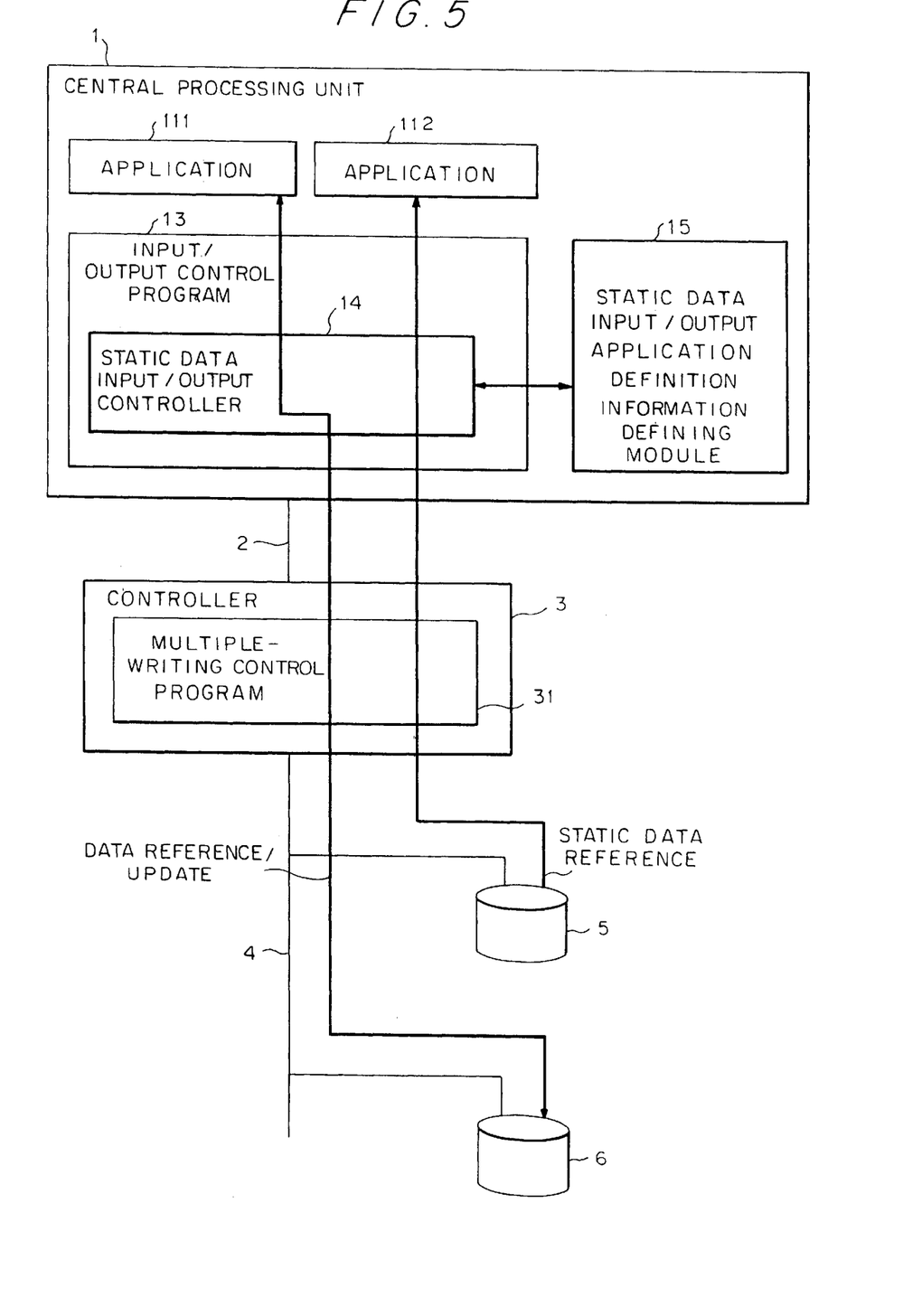
FIG. 5 is a schematic diagram illustrating a third embodiment of the present invention.
Figure 6:
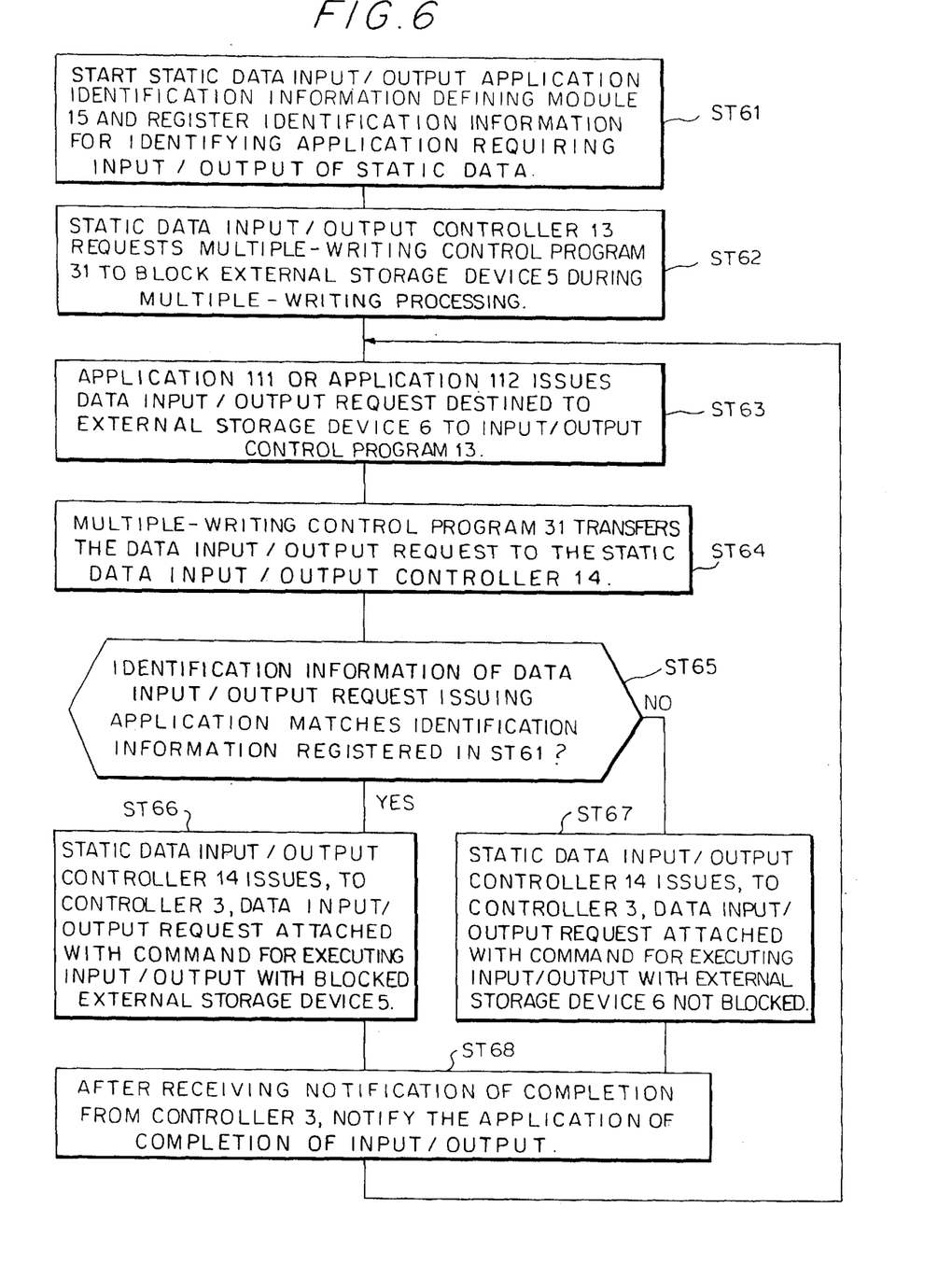
FIG. 6 is a flowchart illustrating the processing performed by the present invention illustrated in FIG. 5.

FIG. 5 illustrates a third embodiment of the present invention to be applied if a duplicate of the data stored in the external storage device 6 already exists because the external storage devices 5 and 6 operate as multiple-writing devices due to a multiple-writing control program operating in the controller 3. Referring to FIG. 5, reference numeral 31 denotes a computer program operating in the controller 3 to execute multiple-writing control on the external storage devices 5 and 6. FIG. 6 is a flowchart illustrating the processing of applying, in the system illustrated in FIG. 5, a capability of inputting/outputting static data not modified by an application after a particular point of time to any other application. It should be noted that each of the steps of the flowchart can, for example, correspond to one or more instructions of a computer program that when executed by a computer causes the computer to perform the indicated steps. The computer program can, for example, be stored in memory in the computer, stored on a storage medium, such as a floppy disk, CD ROM, etc, and installed in the computer, or provided to the computer via a network, such as a local area network, internet, etc.

In step ST61, the identification information for identifying an application that requires input/output of the static data not modified by another application after a particular point in time is registered in the static data input/output application identification information defining module 15. In step ST62, the static data input/output controller 14 requests the multiple-writing control program 31 operating in the controller 3 to block the external storage device 5. When the external storage device 5 has been blocked, a data input/output request is issued from the application 111 or the application 112 to the input/output control program 13 in step ST63. This data input/output request is issued as a data input/output request for the external storage device 6, which is the main device like the conventional multiple-writing controller, regardless of whether the input/output of the static data is required or not.

In step ST64, if the multiple-writing control program 31 finds that the above-mentioned data input/output request is for the external storage device 6, then the multiple-writing control program 31 transfers this data input/output request to the static data input/output controller 14. In step ST65, the static data input/output controller 14 determines whether the identification information held by the application that issued the above-mentioned data input/output request matches the identification information registered in the static data input/output application identification information defining module 15 in step ST61.

If the identifier of the data input/output request source is found matching the registered identifier in step ST65, the operation of step ST66 is executed. In step ST66, the static data input/output controller 14 issues, to the controller 3, a data input/output request attached with a command for executing a data input/output operation with the blocked external storage device 5. On the other than, if no match is found between the identifier of the data input/output request source and the registered identifier in step S65, the operation of step ST67 is executed. In step ST67, the static data input/output controller 14 sends, to the controller 3, the data input/output request attached with a command for executing a data input/output operation with the external storage device 6 not blocked.

In step ST68, receiving a notification of the input/output completion from the controller 3, the static data input/output controller 14 reports the input/output completion to the application (111 or 112) that issued the data input/output request.

The processing operations performed in step ST65 through step ST68 allow the application 111 and the application 112 to perform a data input/output operation without being aware of the blocked external storage device 5 in which the static data is stored. The application 112 can input/output the static data that has not been modified by an application subsequent to the point of time at which the operation of step ST62 was executed.

According to the present invention, the provision of the static data input/output controller and the static data input/output application identification information defining module eliminates the need for an application to be aware of an external storage device in which static data not modified by another application after a particular point in time, thereby enabling input/output of the static data without application modification. Consequently, an application requiring input/output of static data and another application can be executed simultaneously to save business hours without making the applications complicated and involving increase in system cost.

While the present invention has been described in detail and pictorially in the accompanying drawings, it is not limited to such details since many changes and modification recognizable to these of ordinary skill in the art having the benefit of this invention may be made to the invention without departing from the spirit and scope of the invention, and all such modifications as would be obvious to one skilled in the art and/or which become possible as technology develops, are intended to be included within the scope of the following claims.

We claim:

1. A data processing system comprising:
   a first external storage device;
   a controller for controlling a data input/output operation with said external storage device;
   a processing unit for instructing said controller to perform a data input/output operation; and
   means for duplicating data in said first external storage device,
   wherein a static data input/output controller is provided in said processing unit to control a data input/output request to said first external storage device from which the data is duplicated by said duplicating means and a data input/output request to a second external storage device into which the duplicated data is stored, and
   wherein said static data input/output controller determines which of a plurality of applications that issued a data input/output request, and executes a data input/output request issued by a first application on one of the first and second external storage devices and a data input/output request issued by a second application on the other of the first and second external storage devices.

2. A data processing system according to claim 1, wherein execution of an application is temporarily inhibited before storing said static data input/output controller.

3. A data processing system according to claim 2, wherein, upon starting said static data input/output controller, execution of the application in said data processing system is restarted.

4. A data processing system according to claim 1, wherein said static data input/output controller is started at once for said first and second external storage devices and a plurality of sets of duplication of said first and second external storage devices.

5. A data processing system according to claim 4, wherein execution of the application in said data processing F system is temporarily inhibited before starting said static data input/output controller.

6. A data processing system according to claim 5, wherein, upon starting of said static data input/output controller, execution of the application in said data processing system is restarted.

7. A data processing system comprising:
a plurality of external storage devices;
a controller for controlling a data input/output operation with said external storage devices; and a processing unit for instructing said controller to perform a data input/output operation, and performing multiple-writing control on said external storage devices,
wherein a static data input/output controller is provided in said processing unit to determine a source of a data input/output request to specify an external storage device on which a data input/output operation is to be performed and, after inhibiting performance of said multiple-writing control on one of said external storage devices, a data input/output request issued by a first application is executed on the external storage device on which performance of said multiple-writing control has not been inhibited while a data input/output request issued by a second application is executed on the external storage device on which performance of said multiple-writing control has been inhibited.

8. A data processing system according to claim 7, wherein execution of the application in said data processing system is temporarily inhibited before inhibiting operation of the external storage device on which said multiple-writing control has been performed.

9. A data processing system according to claim 8, wherein, upon inhibiting operation of the external storage device on which said multiple-writing control has been performed, execution of the application in said processing unit is restarted.

10. A data processing system according to claim 7, wherein operation of said external devices on which said multiple-writing control has been performed are inhibited by one operation.

11. A data processing system according to claim 10, wherein execution of the application in said data processing system is temporarily inhibited before inhibiting operation of the external storage device on which said multiple-writing control has been performed.

12. A data processing system according to claim 11, wherein, upon inhibiting operation of the external storage device on which said multiple-writing control has been performed, execution of the application in said processing unit is restarted.

13. A data processing system comprising:
a plurality of external storage devices;
a controller for performing multiple-writing control on said external storage devices; and a processing unit for instructing said controller to perform a data input/output operation; wherein a static data input/output controller is provided in said processing unit, said static data input/output controller issues, to said controller, a command for inhibiting operation of an external storage device under multiple-writing control and, upon completion of said command, said static data input/output controller determines a source of a data input/output request, attaches a command for executing a data input/output operation on an external storage device, the operation of which has not been inhibited, onto a data input/output request issued by a first application, attaches a command for executing a data input/output operation on an external storage device, the operation of which has been inhibited, onto a data input/output request issued by a application, and issues said data input/output request to said controller.

14. A data processing system according to claim 13, wherein execution of an application in said data processing system is temporarily inhibited before issuing, to said controller, a command for inhibiting operation of the external storage device on which said multiple-writing control has been performed.

15. A data processing system according to claim 14, wherein, upon completion of said command for inhibiting operation of the external storage device on which said multiple-writing control has been performed, execution of an application in said processing unit is restarted.

16. A data processing system according to claim 13, wherein commands for inhibiting operation of said external storage devices on which said multiple-writing control has been performed are issued by one operation.

17. A data processing system according to claim 16, wherein execution of an application in said data processing system is temporarily inhibited before issuing, to said controller, a command for inhibiting operation of the external storage device on which said multiple-writing control has been performed.

18. A data processing system according to claim 17, wherein, upon completion of said command for inhibiting operation of the external storage device on which said multiple-writing control has been performed, execution of an application in said processing unit is restarted.

19. A method, in a data processing system including a plurality of storage devices, a controller for controlling a data input/output operation with an external storage device, a processing unit for instructing said controller to perform a data input/output operation, and duplicating means for duplicating data in an external storage device for executing one of a plurality of applications which is to be executed using data that has been modified or data that has not been modified, said method comprising:
controlling a data input/output request to a first external storage device from which data is duplicated by said duplicating means and a data input/output request to a second external storage device into which the duplicated data is stored;
determining which of said applications that issued a data input/output request; and
executing a data input/output request issued by a first application on one of the first and second external storage devices, and a data input/output request issued by a second application on the other of the first and second external storage devices.

20. A method according to claim 19, further comprising, temporarily inhibiting execution of an application before starting said controlling steps.

21. A method according to claim 20, further comprising:
upon starting of said controlling step, restarting execution of the application.

22. A method according to claim 19, further comprising:
starting said controlling step at once for said first and second external storage devices and a plurality of sets of duplication of said first and second external storage devices.

23. A method according to claim 22, further comprising:
temporarily inhibiting execution of the application before starting said controlling step.

24. A method according to claim 23, further comprising:
upon starting of said controlling step, restarting execution of the application.

25. A method, in a data processing system including a plurality of external storage devices, a controller for controlling a data input/output operation with said external storage devices, a processing unit for instructing said controller to perform a data input/output operation, and performing multiple-writing control on said external storage devices for executing one of a plurality of applications which is to be executed using data on which multiple-writing control has not been performed, said method comprising:
   determining a source of a data input/output request to specify an external storage device on which a data input/output operation is to be performed;
   inhibiting performance of said multiple-writing control on one of said external storage devices; and
   executing a data input/output request issued by a first application on an external storage device on which performance of said multiple-writing control has not been inhibited while executing a data input/output requested issued by a second application on an external storage device on which performance of said multiple-writing control has been inhibited.

26. A method according to claim 25, further comprising:
temporarily inhibiting execution of an application before inhibiting operation of the external storage device on which said multiple-writing control has been performed.

27. A method according to claim 26, further comprising:
upon inhibiting operation of the external storage device on which said multiple-writing control has been performed, restarting execution of the application.

28. A method according to claim 25, further comprising:
inhibiting operation of external storage devices on which said multiple-writing control has been performed by one operation.

29. A method according to claim 28, further comprising:
temporarily inhibiting execution of the application before inhibiting operation of the external storage device which said multiple-writing control has been performed.

30. A method according to claim 29, further comprising:
upon inhibiting operation of the external storage device on which said multiple-writing control has been performed, restarting execution of the application.

31. A method in a data processing including a plurality of external storage devices, a controller for performing multiple-writing control on said external storage devices, and a processing unit for instructing said controller to perform a data input/output operation for executing one of a plurality of applications which is to be executed using data on which multiple-writing control has been performed or data on which multiple-writing control has not been performed, said method comprising:
   issuing a command for inhibiting operation of an external storage device under multiple-writing control;
   upon completion of said command, determining a source of a data input/output request;
   attaching a command for executing a data input/output operation on an external storage device, the operation of which has not been inhibited, on a data input/output request issued by a first application while attaching a command for executing operation on an external storage device, the operation of which has been inhibited, on a data input/output requested issued by a second application; and
   issuing said data input/output request.

32. A method according to claim 31, further comprising:
temporarily inhibiting execution of an application before issuing a command for inhibiting operation of external storage device on which said multiple-writing control has been performed.

33. A method according to claim 32, further comprising:
upon completion of said command for inhibiting operation of the external storage device on which said multiple-writing control has been performed, restarting execution of the application.

34. A method according to claim 31, further comprising:
issuing commands for inhibiting operation of external storage devices on which said multiple-writing control has been performed by one operation.

35. A method according to claim 34, further comprising:
temporarily inhibiting execution of the application before issuing a command for inhibiting operation of external storage device on which said multiple-writing control has been performed.

36. A method according to claims 35, further comprising:
upon completion of said command for inhibiting operation of the external storage device on which said multiple-writing control has been performed, restarting execution of the application.

37. A computer program stored on a storage medium for causing a data processing system to execute one of a plurality of applications which is to be executed using data that has been modified or data that has not been modified, said data processing system includes a plurality of external storage devices, a controller for controlling a data input/output operation with an external storage device, a processing unit for instructing said controller to perform a data input/output operation, and duplicating means for duplicating data in an external storage device, said computer program when executed causes said data processing system to perform the steps of:
   controlling a data input/output request a first external storage device from which data is duplicated by said duplicating means and a data input/output request to a second external storage device into which the duplicated data is stored;
   determining which of said applications that issued a data input/output request; and
   executing a data input/output request issued by a first application on one of the first and second external storage devices, and a data input/output request issued by a second application on the other of the first and second external storage devices.

38. A computer program according to claim 37, wherein said computer program when executed further causes the data processing system to perform the step of:
   temporarily inhibiting execution of an application before starting said controlling steps.

39. A computer program according to claim 38, wherein said computer program when executed further causes the data processing system to perform the step of:
   upon starting of said controlling, restarting execution of the application.

40. A computer program according to claim 37, wherein said computer program when executed further causes the data processing system to perform the step of:
   starting said controlling step at once for said first and second external storage devices and a plurality of sets of duplication of said first and second external storage devices.

41. A computer program according to claim 40, wherein said computer program when executed further causes the data processing system to perform the step of:

temporarily inhibiting execution of the application before starting said controlling step.

42. A computer program according to claim 41, wherein said computer program when executed further causes the data processing system to perform the step of:

upon starting of said controlling step, restarting execution of the application.

43. A computer program stored on a storage medium for causing a data processing system to execute one of a plurality of application which is to be executed using data on which multiple-writing control has been performed, or data on which multiple-writing control has not been performed, said data processing system includes a plurality of external storage devices, a controller for controlling a data input/output operation with said external storage devices, said computer program when executed causes said data processing system to perform the steps of:

determining a source of a data input/output request to specify an external storage device on which a data input/output operation is to be performed;

inhibiting performance of said multiple-writing control on one of said external storage devices; and executing a data input/output request issued by a first application on an external storage device on which performance of said multiple-writing control has not been inhibited while executing a data input/output requested issued by a second application on an external storage device on which performance of said multiple-writing control has been inhibited.

44. A computer program according to claim 43, wherein said computer program when executed further causes the data processing system to perform the step of:

temporarily inhibiting execution of an application before inhibiting operation of the external storage device on which said multiple-writing control has been performed.

45. A computer program according to claim 44, wherein said computer program when executed further causes the data processing system to perform the step of:

upon inhibiting operation of the external storage device on which said multiple-writing control has been performed, restarting execution of the application.

46. A computer program according to claim 43, wherein said computer program when executed further causes the data processing system to perform the step of:

inhibiting operation of external storage devices on which said multiple-writing control has been performed by one operation.

47. A computer program according to claim 46, wherein said computer program when executed further causes the data processing system to perform the step of:

temporarily inhibiting execution of the application before inhibiting operation of the external storage device which said multiple-writing control has been performed.

48. A computer program according to claim 47, wherein said computer program when executed further causes the data processing system to perform the step of:

upon inhibiting operation of the external storage device on which said multiple-writing control has been performed, restarting execution of the application.

49. A computer program stored on a storage medium for causing a data processing system to execute one of a plurality of applications which is to be executed using data that has been modified or data that has not been modified, said data processing includes a plurality of external storage devices, a controller for performing multiple-writing control on said external storage devices, and a processing unit for instructing said controller to perform a data input/output operation, said computer program when executed causes said data processing system to perform the steps of:

issuing a command for inhibiting operation of an external storage device under multiple-writing control;

upon completion of said command, determining a source of a data input/output request;

attaching a command for executing a data input/output operation on an external storage device, the operation of which has not been inhibited, on a data input/output request issued by a first application while attaching a command for executing operation on an external storage device, the operation of which has been inhibited, on a data input/output requested issued by a second application; and issuing said data input/output request.

50. A computer program according to claim 49, wherein said computer program when executed further causes the data processing system to perform the step of:

temporarily inhibiting execution of an application before issuing a command for inhibiting operation of external storage device on which said multiple-writing control has been performed.

51. A computer program according to claim 50, wherein said computer program when executed further causes the data processing system to perform the step of:

upon completion of said command for inhibiting operation of the external storage device on which said multiple-writing control has been performed, restarting execution of the application.

52. A computer program according to claim 49, wherein said computer program when executed further causes the data processing system to perform the step of:

issuing commands for inhibiting operation of external storage devices on which said multiple-writing control has been performed by one operation.

53. A computer program according to claim 52, wherein said computer program when executed further causes the data processing system to perform the step of:

temporarily inhibiting execution of the application before issuing a command for inhibiting operation of external storage device on which said multiple-writing control has been performed.

54. A computer program according to claims 53, wherein said computer program when executed further causes the data processing system to perform the step of:

upon completion of said command for inhibiting operation of the external storage device on which said multiple-writing control has been performed, restarting execution of the application.

* * * * *